Dec. 27, 1949 M. C. GAUTHIER 2,492,564
GAUGE FOR FLAT ARTICLES
Filed June 3, 1947 2 Sheets-Sheet 1

INVENTOR
M.C. GAUTHIER
BY
ATTORNEY

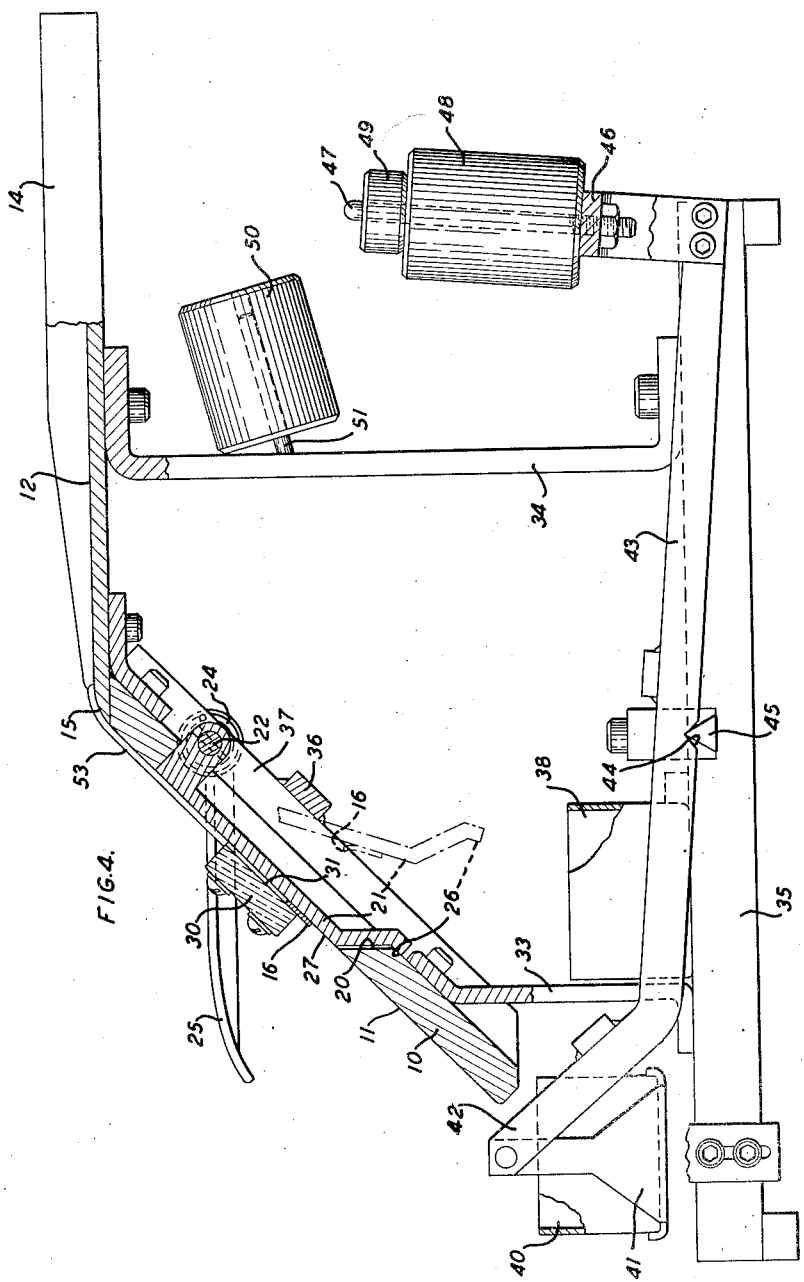

Patented Dec. 27, 1949

2,492,564

UNITED STATES PATENT OFFICE 2,492,564

GAUGE FOR FLAT ARTICLES

Marcel C. Gauthier, Montclair, N. J., assignor to Western Electric Company, Incorporated, New York, N. Y., a corporation of New York Application June 3, 1947, Serial No. 752,098

1 Claim. (Cl. 209—72)

This invention relates to gages and more particularly to a gage for testing the flatness of articles.

In the manufacture of variable plate condensers the rotor and stator plates are punched from sheet metal stock, and it is highly important that these plates be flat when they are assembled in their respective units and later united to form complete condensers. When assembled in their respective units, the stator plates are given distances apart to allow for movement of the rotor plates therebetween, leaving air gaps of given equal dimensions. If any of the stator plates or rotor plates should be bent, they would produce a defective unit, and for this reason these plates must be tested for flatness before they are assembled.

The object of the present invention is to provide a gage which is highly efficient and practical for testing the flatness of articles and to separate the defective articles from those which pass the test.

With this and other objects in view the invention comprises a gage to test the flatness of articles including a chute having an aperture therein and a surface extending downwardly in a given plane and down which the articles to be gaged may travel singly in a given path. A stationary gage element, extending transversely of the aperture, is mounted on the chute with its inner surface positioned a given distance from the said plane. A movable gage element, disposed in the aperture of the chute, has a surface, over which the articles will travel, lying in the said plane to cooperate with the stationary gage element in providing a passageway through which satisfactory articles may pass. The unsatisfactory articles are stopped by the gage elements so that they may be directed in another path. The movable gage element is mounted on a pivot and held by a spring in its closed position, closing the aperture in the chute and locating its surface in the plane of the surface of the chute. By the aid of a handle the movable element may be moved away from the stationary element to direct the unsatisfactory articles in a different path.

In the present embodiment of the invention the stationary element is formed of a transparent material whereby articles lodged between the two gaging elements may be observed by the operator. A tray having an exit end opening to the surface of the chute supports a supply of articles to be gaged.

Other objects and advantages will be apparent from the following detailed description when considered in conjunction with the accompanying drawings wherein:

Fig. 4 is a side elevational view of the gage, portions thereof being shown in section.

Figure 1:
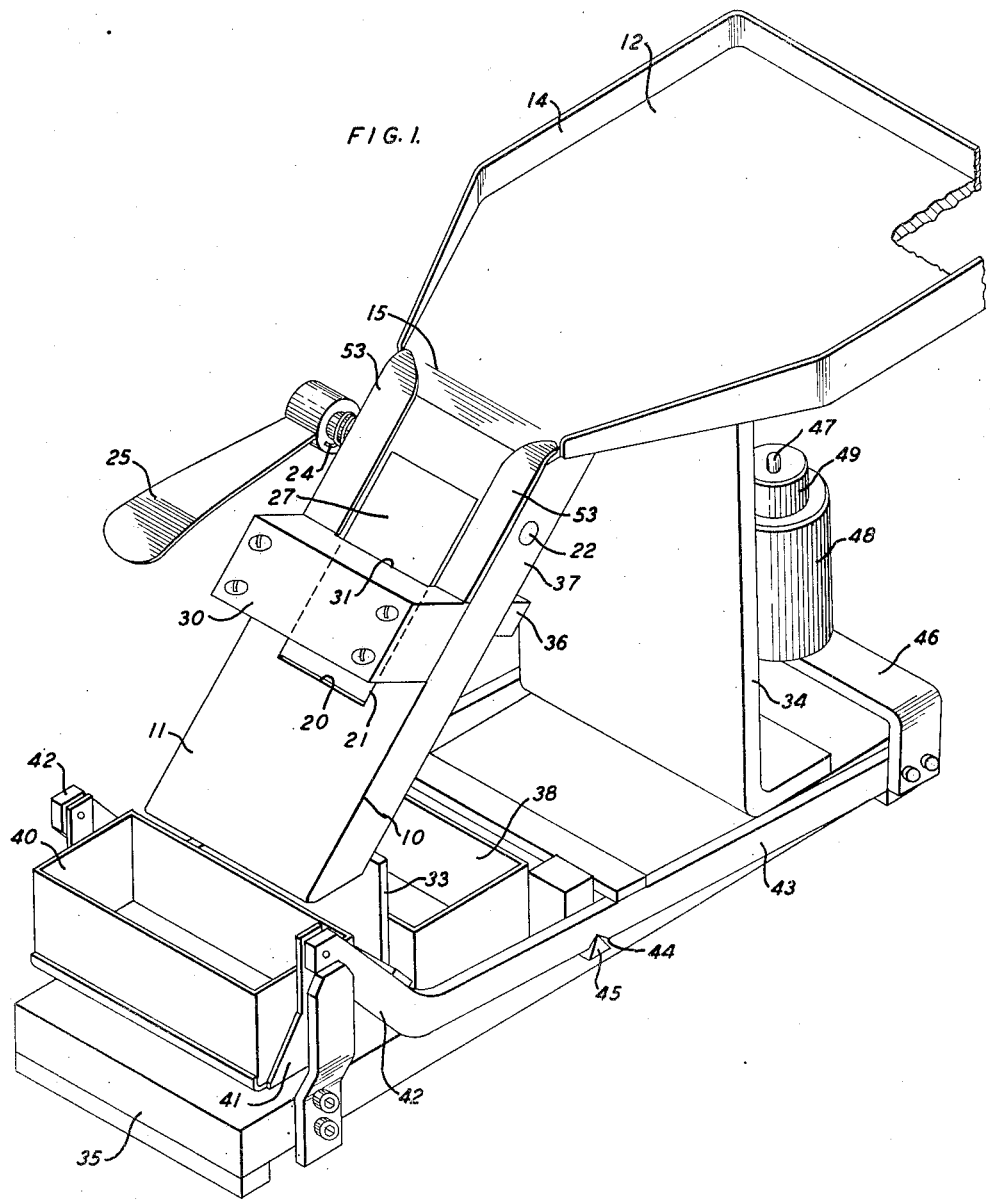
Fig. 1 is an isometric view of the gage.

Referring now to the drawings, the gage includes a chute 10 having a surface 11 extending diagonally downwardly in a given plane from the tray 12 on which a supply of articles may be disposed. A flange member 14 surrounding the tray, excepting at the exit end 15, keeps the articles in place on the tray.

Figure 2:
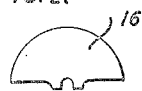
Fig. 2 is a plane view of the rotor element, one of the articles to be gaged.
Figure 3:
Fig. 3 is a plane view of the stator element, another one of the articles to be gaged.

In the present embodiment of the invention two different types of articles are to be gaged, these articles being shown respectively in Figs. 2 and 3. One of the articles is a rotor plate 16, while the other is a stator plate 17, both plates in the present instance having been blanked from sheet metal of like thicknesses, making it possible for the gage to test the flatness of both types of articles. Only one type of article, however, will be tested at a time, the reasons being that they are to be kept in their respective groups and are to be weighed for packing in given quantities.

The chute 10 has an aperture 20 therein which is filled by a movable gaging element 21. The gaging element 21 is mounted upon a shaft or pivot 22, the ends of which are journalled in the sides of th chut 10 upon ach sid of th aprzhyh su ture 20. The movable element 21 is fixed to the shaft by the aid of a pin, the shaft being normally urged into a given position to hold the movable gaging element in its closed position within the aperture by the aid of a helical spring 24. The shaft may be rocked to rock the movable element into the broken line position shown in Fig. 4 by the aid of a handle 25 which is fixedly mounted upon the shaft 22. An inner lip 26 of the element 21 abuts against the inner surface of the chute 10, serving as a stop for the element to locate its outer gaging surface 27 within the plane of the surface 11 of the chute.

A stationary gaging element 30 is mounted at its ends upon the chute 10 and extends transversely of the aperture 20 and the movable gaging element 21 where its inner or lower surface 31 is positioned a given distance from the plane of the surface 11 of the chute and the surface 27 of the gaging element 21. This distance creates the gaging path through which satisfactory articles may pass freely, the gaging elements stopping any of the articles which have been bent, causing them to be unsatisfactory.

The chute 10 is supported by a bracket 33 while the tray 12 is supported by a bracket 34, these brackets being mounted upon a base 35, the main support for the gage. A stop 36, extending transversely of the chute, is mounted on downwardly projecting sides 37 thereof to stop the rocking motion of the gaging element to direct unsatisfactory articles into a receptacle 38, located on the base 35. The satisfactory articles are free to pass down the chute and into a receptacle 40 which is removably supported in a cradle 41, pivotally supported between arms 42 of a frame 43. The frame 43 is notched upon each side at 44 to receive triangular fulcrum members 45 upon which the frame 43 is supported. A laterally extending member 46 of the frame disposed beneath the tray 12 supports a rod 47 to receive weights 48, 49, and/or 50.

It is known that a given number of the articles 16, or 17, weigh given amounts, and to avoid the necessity of counting the articles, the operator need only place certain of the weights on the rod 47 to determine when a predetermined number of the articles have been gaged and dropped into the receptacle 40, causing movement of the frame 43 to balance the selected weights. Owing to the fact that the stator plates may weigh slightly more than the rotor plates, different sets of weights are required, the weight, or weights, which are not being used being located on a pin 51 mounted on the bracket 34.

To illustrate the use of the gage let it be assumed that a supply of the rotor plates 16 are placed upon the tray 12 and that the operator frees the plates singly, allowing them to slide down the chute and over the movable gaging element 21. To be assured that the articles will be directed toward the gaging elements in the path between the elements, guides 53 are mounted on the chute upon each side of the aperture 20. If the articles prove satisfactory, they will continue in their movement between the gaging element and drop into the receptacle 40. The operator may readily follow each article visually down the chute and between the gaging elements owing to the fact that the gaging element 30 is transparent. If any of the articles should prove unsatisfactory by being bent whereby they could not travel through the passageway between the gaging elements, they will be stopped either above the gaging element 30 or before they have completed their travel between the gaging elements. The transparent nature of the element 30 permits the operator to observe whether or not any article is stopped beneath this element at a point where the article would be hidden if the gaging element were opaque. When any unsatisfactory article appears, the operator rocks the lever 25, moving the gaging element 21 against the stop 36, allowing the unsatisfactory article to continue its movement downwardly but in a different path directed toward the receptacle 38.

The gaging element 30 has been described as being formed of a transparent material such as glass. It should be understood that the term "transparent" is intended to include materials which may be frosted or otherwise dulled to the point of removing disturbing glare without affecting the visibility of articles passing therebeneath.

Although specific improvements of the invention have been shown and described as a gage for testing condenser plates, it will be understood that they are but illustrative and that various modifications may be made therein and that other articles of a similar type may be tested without departing from the scope and spirit of this invention as defined by the appended claim.

What is claimed is:

In a gage for testing the flatness of articles, a chute down which the flat articles to be tested slide singly, said chute having an opening intermediate the ends thereof, a movable gaging element normally closing said opening, a stationary transparent gaging member secured to the chute and extending transversely of the movable gaging element with its under plane surface positioned a predetermined gaging distance from the upper surface of the movable gaging element, guides mounted on each side of the chute for guiding the articles between the gaging element and the gaging member, manually operated means for moving the movable gaging element so that a non-uniform article caught between the gaging element and the gaging member may be dropped quickly through the said opening in the chute, means for determining the extent of movement of the movable gaging element to divert non-uniform articles into a definite path, and automatic means for thereafter returning the movable gaging element to close the opening in the chute.

MARCEL C. GAUTHIER.

REFERENCES CITED

The following references are of record in the file of this patent:

UNITED STATES PATENTS

| Number | Name | Date |
|---|---|---|
| 290,700 | Morton | Dec. 25, 1883 |
| 369,939 | Hiatt | Sept. 13, 1887 |
| 672,209 | Eberling | Apr. 6, 1901 |
| 1,013,648 | Emery | Jan. 2, 1912 |
| 1,281,855 | Schwartz | Oct. 15, 1918 |
| 1,316,971 | Pratt | Sept. 23, 1919 |
| 2,079,255 | Jones | May 4, 1937 |
| 2,091,815 | Hommel | Aug. 31, 1937 |
| 2,116,398 | Makenny | May 3, 1938 |

Certificate of Correction

Patent No. 2,492,564                                            December 27, 1949

MARCEL C. GAUTHIER

It is hereby certified that errors appear in the printed specification of the above numbered patent requiring correction as follows:

Column 2, line 35, beginning with "sides" strike out all to and including "su" in same line and insert instead the words and syllable *sides of the chute 10 upon each side of the aper-*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*